United States Patent [19]
Dornte

[11] 3,726,703
[45] Apr. 10, 1973

[54] NON-FOGGING MATERIAL
[75] Inventor: Ralph William Dornte, Lower Southampton Township, Pa.
[73] Assignee: ESB Incorporated, Philadelphia, Pa.
[22] Filed: Nov. 4, 1970
[21] Appl. No.: 86,883

[52] U.S. Cl.....177/47 A, 117/124 E, 117/138.8 UA, 117/138.8 A, 117/138.8 F, 106/13, 117/161 UN
[51] Int. Cl.............................C09k 3/18, C03c 17/32
[58] Field of Search................117/124 E, 161 UN, 117/138.8 UA, 138.8 A; 106/13

[56] References Cited

UNITED STATES PATENTS

| | | | |
|---|---|---|---|
| 3,471,359 | 10/1969 | Goldstein | 161/227 |
| 3,286,009 | 11/1966 | Yumoto et al. | 117/8 |
| 3,515,579 | 6/1970 | Shepherd et al. | 117/161 UN |

*Primary Examiner*—William D. Martin
*Assistant Examiner*—David Cohen
*Attorney*—Thomas A. Lennox, Robert H. Robinson, Raymond L. Balfour and Anthony J. Rossi

[57] ABSTRACT

A non-fogging material is provided by applying a transparent non-fogging coating to a normally fogging transparent or reflecting substrate. The non-fogging coating comprises a highly cross-linked alkylene imine polymer. The polyalkylene imine may be further modified by an adhesion promoter through reaction with the amine hydrogens of the polyimine. The non-fogging articles include goggles — safety and ski, bathroom mirrors, windows, boat windshields, packages, eye-glasses and gas masks.

24 Claims, 7 Drawing Figures

PATENTED APR 10 1973

INVENTOR.
Ralph W. Dornte

INVENTOR.
Ralph W. Dornte

NON-FOGGING MATERIAL

BACKGROUND OF THE INVENTION

When a surface is at a temperature on or below the dew point of the prevailing atmosphere, water condenses on the surface in the form of small droplets. When the condensation is on transparent or reflecting surfaces it is referred to as "fogging." This problem of fogging is critical for some applications and at least troublesome for many others. Substrates of plastic, glass, and metal surfaces all fog without some modification. Many attempts have been made to reduce or eliminate the fogging problem particularly for automobile windshields and safety goggles. Early attempts included the application of films containing glycerol and more recently coatings based on hydroxy substituted acrylic polymers have been offered; see U.S. Pat. No. 3,488,215 to Shepherd et al. Other coatings offered to reduce the fogging of surfaces include films containing surfactants and more recently U.S. Pat. No. 3,411,945 to Chao describes the incorporation of surfactants in the thermoplastic polymer substrate to reduce the tendency towards fogging of the surface.

Accordingly, it is an object of the present invention to provide a non-fogging surface that does not interfere with the transparency or reflectance of the substrate material. An additional object is to provide a transparent, non-fogging coating with improved permanence of the anti-fogging protection, increased adhesion to the substrate, improved scratch and abrasion resistance, improved durability of the adhesion to the substrate and improved durability of the surface of the coating.

An additional object is to provide a transparent coating that will reduce the fogging characteristics for transparent or reflecting surfaces that may be easily applied to the surfaces to provide consistent results. A more specific object is to prepare a transparent, non-fogging coating for transparent or reflecting surfaces of glass, plastic or metal. An object is to provide non-fogging eye lenses and protective shields, windows and mirrors.

An additional object is to provide a transparent non-fogging coating for transparent substrates, particularly polycarbonate, with improved permanence and abrasion resistance.

SUMMARY OF THE INVENTION

The present invention is a substrate having on at least one surface thereof a non-fogging coating comprising a polyalkylene imine (e.g. polyethylene imine) cross-linked with a compound having at least two reactive groups capable of reacting with the amine hydrogen or yielding a covalent linkage to form a quaternary amine salt, to form a hard, durable, hydrophilic coating. For most substrates, the degree of cross-linking is preferably high, such that sufficient cross-linking functional compound is added capable of cross-linking the film to attain water insolubility. For certain substrates pendant reactive groups are optionally reacted to the amine hydrogens of the polyalkylene imine, the pendant groups being highly polar to promote adhesion to the substrate.

The coated surface of this invention is hard and resistant to abrasion. The coating absorbs up to 50 percent water on the weight of the coating without distortion or loss of adhesion to the substrate.

DESCRIPTION OF THE PREFERRED EMBODIMENTS

Figure 1:
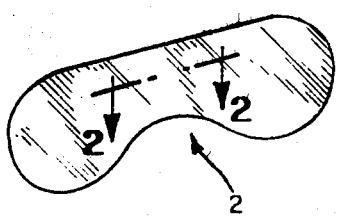
FIG. 1 is a view of a lens from a safety goggle.

The substrates most useful in this invention that are normally subject to fogging include organic polymers, particularly polycarbonate. This polymer is commonly used for shields and goggles for industrial application where fogging can constitute a safety hazard. The coated polycarbonate substrate of this invention not only offers anti-fogging characteristics but also improved abrasion resistance and mechanical properties. The non-fogging materials of this invention are normally transparent although they may be tinted such colors as amber for ski goggles.

The polyalkylene imine useful in this invention is a well recognized class of compounds available commercially with the following repeating unit structural formula I:

I. 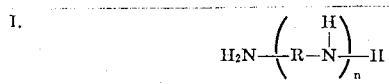

, wherein R is substituted or unsubstituted alkylene group and $n$ is an integer from about 2 to about 3,000.

When the backbone alkylene group is ethylene, the structural formula of the repeating unit takes the form of formula II:

II. 

, wherein $R_1$ through $R_4$ are chosen from the group consisting of hydrogen and lower alkyl and $n$ is as hereinabove. It is preferred that $R_1$ through $R_4$ be chosen from the group consisting of hydrogen or methyl. Particularly preferred is polyethylene imine that is prepared by polymerizing ethylene imine in acid medium.

One skilled in the art will readily recognize that both formulas I and II are simplifications of the structural formula of polyalkylene imines. It is well known that this class of polymers generally forms a highly branched rather than a linear polymer structure. As a consequence, a typical structure of polyethylene imine contains a ratio of primary to secondary to tertiary nitrogens in the polymer of approximately 1:2:1. This branching does not interfere with the purposes of this invention and in fact this ratio is quite satisfactory. The formulas I and II may be considered as roughly average structures of the polymer particularly at higher molecular weights.

Although the molecular weight of the polyethylene imine polymer is not critical to the invention, the lower molecular weight range is preferred, primarily for ease of processing, handling and applying the solution to the substrate before cross-linking. The number average molecular weight ($M_n$) of commercially available polyethylene imine commonly ranges from about 60 (dimer) to about 120,000, and includes dipropylenetriamine, tetraethylenepentamine, etc. Preferred are polymers with average molecular weights in the range of 300 to 60,000 and most preferred is the range of 400 to 1,000.

With the higher molecular weight polyimine, the number of amine hydrogens per nitrogen atom approaches one. Theoretically, each nitrogen atom can also form a quaternary salt so that the maximum number of reactive sites per repeating unit approaches two as the molecular weight of the polyimine is increased. For the preferred lower molecular weight range the terminal groups significantly affect the number of reactive sites available for either cross-linking or attachment of pendant groups. For example, polyimine with an average molecular weight of 300 has about seven repeating units and about nine amine hydrogens for an average of about 1.3 amine hydrogens per repeating unit. Including the quaternary salt reaction capability brings the average number of reactive sites per repeating unit to about 2.3.

The coating of this invention is cross-linked by reaction with the amine hydrogens and/or through bonding to the nitrogen to form a quaternary ionic salt. The poly-functional compounds capable of cross-linking the imine polymer contain at least two groups capable of reacting with either the imine hydrogen or the nitrogen atom. Thus the compound may contain (1) at least two functional groups that react only with amine by hydrogens, e.g. divinyl benzene, (2) at least two functional groups capable of reacting with either the amine hydrogen or the nitrogen to form a quaternary salt, e.g. methylene chloride, (3) at least one functional group capable of reacting with the amine hydrogen and at least one group capable of reacting with the nitrogen to form a quaternary salt, e.g. epichlorohydrin, or (4) at least one functional group capable of reacting with the amine hydrogen to form during the reaction a secondary functional group that in turn will react with the polyimine or with another group of like type, e.g. formaldehyde.

It is common to provide both cross-linking mechanisms in the same coating compositions, and it is also common to employ cross-linking compounds of more than one of the above groups. For example, the compounds of group (1) are particularly useful for chain extension reactions while the coating is in solution without gelling the product. Because of the branched nature of the polyalkylene imine polymers and the combination of cross-linking reactions taking place it is not known in which proportions the types of cross-linking reactions are taking place. The critical factor in the chemical compositions capable of cross-linking the polyalkylene imine polymers is that they contain at least two functional groups capable of either reacting with amine hydrogens or forming a covalent bond to a quaternary salt. References in the specification to "amine hydrogens" include both the primary and secondary nitrogen substituted hydrogen.

As a typical example, epichlorohydrin is a preferred cross-linking compound chosen from group (3) above. In this instance the cross-linking compound contains both epoxy and halogen functionality, each of which have the ability to react with the amine hydrogens on the polyalkylene imine polymers. If in the composition there are insufficient amine hydrogens to react with both the epoxy group and the halogen, the halogen can still react with the nitrogen group through the formation of a quaternary salt.

The class of functional groups capable of these reactions is well known to those skilled in the art and includes nonaromatic ethylenic unsaturation (activated unsaturation) like vinyl, vinylene, allyl, and butylene in such compounds as ethylene glycol diacrylate and dimethacrylate, glycidyl methacrylate, divinyl benzene, diallyl phthalate, triallyl cyanurate, butylene glycol diacrylate, polypropylene fumarate, allyl chloride, glycidyl methacrylate, maleic anhydride, fumaric acid, dichloromaleic anhydride, N,N'-methylene bisacrylamide, methacrylic acid, acrylic acid, 2-chloroethyl methacrylate and the like; epoxy and epihalo in such compounds as diepoxides, epihalohydrin, particularly epichlorohydrin, glycidyl methacrylate, glycidol, low molecular weight epoxy resins such as the reaction product of epichlorohydrin and bisphenol-A, and the like; halo such as alkylene halide and acid halide like chloro, bromo and fluoro in such compounds as methylene chloride, methylene bromide, 1,2-dichloroethane, bis (2-chloroethyl) ether, epichlorohydrin, dichloromaleic anhydride, allyl chloride, 2-chloroethyl methacrylate, adipyl chloride; formyl and carbonyl in aldehydes and ketones in such compounds benzaldehyde, formaldehyde, 5,5-dimethyl-1,3-cyclohexadione, 2,5-hexanedione, dipentene dioxide and the like; carboxy and anhydride in such compounds as phthalic acids and anhydride, polyacrylic acid, glutaric acid, pyromellitic anhydride, methacrylic acid, acrylic acid, maleic anhydride, ethylene/maleic anhydride copolymers, and the like; isocyanato and isothiocyanato in such compounds as methylene bis(4-phenyl isocyanate and isothiocyanate); acidic hydroxy including phenolic hydroxy in such compounds as bisphenol-A and the like; and other functional groups that react directly or through intermediate reactions with either the amine hydrogens or the nitrogen atoms to form quaternary salts. The intermediate reactions possible are numerous in that many of the cross-linking compounds form additional functional groups during the reaction with the polyimine. Some of these secondarily formed functional groups may in turn react with a polyimine or more likely react with the reaction product of another reaction with the polyimine. As an example, the reaction of glycidol with the polyimine is believed to first attach through an addition reaction of the epoxy with the amine hydrogen. A secondary reaction between two of these reaction products (each containing two hydroxyl groups) to yield a cross-link between the polyimine chains is possible, although this theory has not yet been clearly demonstrated. The term "polyfunctional" in describing the cross-linking compounds also includes those chemical compounds that through the reaction with the polyimine, form an additional functional group that reacts with the polyimine or the same functional group to form another site. An example of this type of polyfunctional compound is formaldehyde with which the reaction with the amine hydrogen forms a methylol group that will in turn react with another methylol group splitting out water to cross-link the imine polymer.

Preferred are those cross-linking compounds containing two functional groups of at least one chosen from the group consisting of epoxy, ethylenic unsaturation and halo. The compounds containing a combination of epoxy and halogen functionality, as represented by chemical structure depicted in formula III, are particularly effective and epichlorohydrin is particularly preferred.

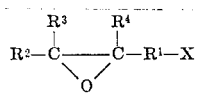

, where $R^1$ is $C_1$ to $C_8$ alkylene; $R^2$ to $R^4$ are each hydrogen or lower alkyl and X is halogen.

The amount of cross-linking compounds reacted with the polyalkylene imine depends to a degree on the choice of cross-linking compound and the particular qualities desired in addition to the anti-fog characteristics obtained through the invention.

The amount of cross-linking compound generally useful to provide a durable coating is that amount necessary to effectively provide a water insoluble film coating. A preferred effective amount of cross-linking compound is that amount necessary to yield a cured coating that gains less than 100 percent by weight of water on the weight of the film upon immersion to equilibrium. It is commonly desirable to react all of the amine hydrogens with either the cross-linking compound above or in combination with optional pendant mono-functional groups. In fact, it is not uncommon to provide sufficient amount of cross-linking and monofunctional compounds to react not only with all of the amine hydrogens in the polyimine but provide an excess which will copolymerize or homopolymerize with the cross-linking compounds. As an example, an effective coating is that in which approximately half of the amine hydrogens on the polyimine are first reacted with acrylonitrile followed by a cross-linking reaction in which there is present not only sufficient functional groups to react with all of the amine hydrogens but an excess to react with other functional groups of the cross-linking compound or react with the nitrogen to form a quaternary salt. In general, the amount of cross-linking compound is present in amounts of 0.3 to 2.5 moles per equivalent weight of the alkylene imine repeating unit in the polyimine. Preferred is an amount of 0.4 to 2.0 moles cross-linking compound per imine repeating unit in the polymer. An amount 0.5 to 0.9 moles per imine repeating unit in the polymer is more preferred.

With some substrates, it is optional to react monofunctional compounds onto the polyalkylene amine polymers that do not effectively cross-link the polymer. These mono-functional compounds react with polyimine to form groups that are generally pendant and may be particularly effective in promoting adhesion to the substrate. The adhesion promoters are preferably reacted onto the polyalkylene imine before any reaction with the cross-linking compounds. Of particular preference are highly polar functional groups which promote adhesion to polymeric substrates such as polycarbonate resins, acrylic polymers, and the like. These highly polar groups may be attached by any of the functional groups effective in the cross-linking compounds with the criticality being that only one of those functional groups capable of reacting with the amine hydrogens be present and that the highly polar pendant groups not react with the amine hydrogen so as not to cross-link the polymer. These relatively inert pendant groups include cyano, amido, acetyl, and aryl. Typical chemical compounds which may be reacted with the polyalkylene imine include acrylonitrile, acrylamide, methacrylamide N-alkyl acrylamides, methyl methacrylate, methyl acrylate and styrenes. Of particular preference is acrylonitrile.

The amount of pendant polar groups reacted onto the imine polymer should still have at least about 20 mole percent of the amine hydrogens still available for cross-linking for best results. Thus, the amount of polar pendant groups added to the composition ranges from 0 to about 80 mole percent of the alkylene imine equivalent weight of repeating unit. An excess charge of the modifier is possible when the reactive group has a tendency to homopolymerize thus providing an inefficient reaction to form the polar pendant groups. A particularly effective embodiment for use on polymeric substrates contains 10 to 75 mole percent pendent reactant per equivalent weight of imine repeating unit in the polymer, more preferably 0.20 to 0.65 mole percent.

Additional ingredients, added in minor quantities, may be included in the coating composition. These include dyes, leveling agents, and colorants which are either soluble in the polymer or are dispersed in such small particle size so as not to introduce significant haze in the coating. Other typical ingredients which may be included are ultra-violet stabilizers, heat stabilizers and the like.

The method of application of the coating to the substrate is not critical to the invention. It may be applied by dip coating, spray coating or roller coating.

Figure 7:
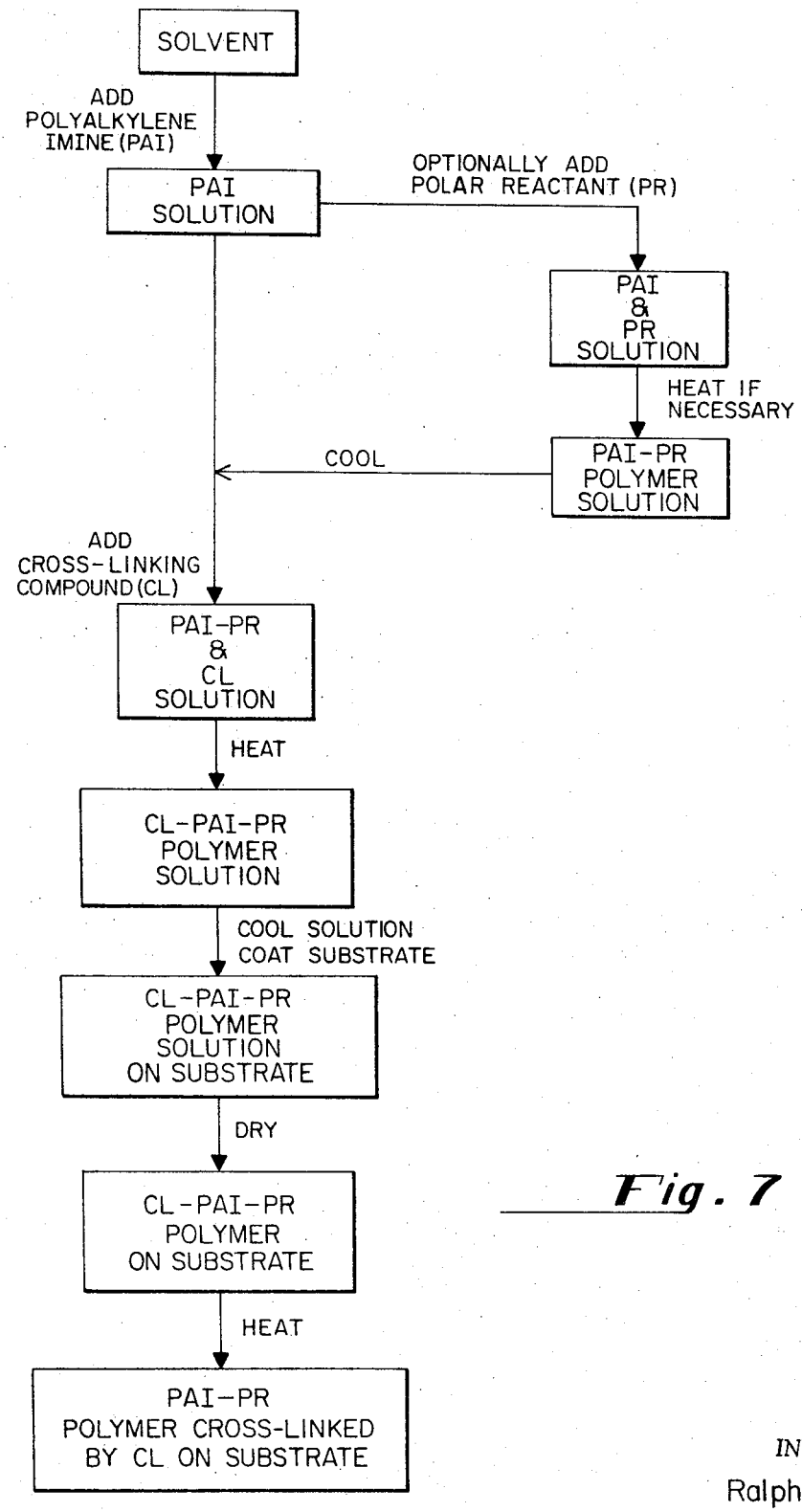
FIG. 7 is a flow diagram of a method of application of the anti-fog coating of this invention to the substrate.

The coating composition prior to application may be prepared by any known method but best results are obtained when the solution is prepared by the scheme depicted in FIG. 7. In this method of providing fogging protection the polyalkylene imine is placed into solution, such as in water, alcohol, or water-alcohol mixtures (PAI solution). Water-lower alcohol mixtures are effective and mixtures containing 1 to 25 percent alcohols are preferred. 2-propanol is most effective in the aqueous solution. If the optional adhesion promoters (polar reactant-PR) are to be reacted with the polyalkylene imine, it is preferred to add them to the solution before the addition of cross-linking compounds and allow them to react with the amine hydrogens (to form PAI-PR polymer — FIG. 7). Generally, as in the case of acrylonitrile, the reaction occurs spontaneously with the evolution of heat and it is only necessary to control the temperature to prevent exotherm runaway. The cross-linking chemical compounds (CL) are then added to the solution after which the substrate may be directly coated with the solution. For ease of handling, stability and best results it is preferred to allow or cause the cross-linking compound to react with the polyalkylene imine primarily as a chain extender (to form CL-PAI-PR polymer) such that it does not sufficiently cross-link the polymer to cause gel or precipitation of the polymer, preferably in the range of about 60° to 90° C for one-fourth to one-half hour. For these initial reactions the chain extension reaction is most easily carried out with low molecular weight polyalkylene imine and CL capable of reacting only with amine hydrogens. With the lower molecular polyimine the molecular weight of the extended polymer is more easily controlled to prevent gel. After the initial reaction with the cross-linking compound, the solution stabilizes and no further reaction takes place to gel or precipitate the polymer for a number of days. Refrigeration extends the life of the solution. After the substrate surface is coated with the solution, the coated surface (CL-PAI-PR polymer) may be immediately heated but it is preferred that most of the solvent be allowed to evaporate before heating. Temperatures to 130° C, generally 60° to 120° C, preferably 70°-90° C, are used to fully cross-link the imine polymer (PAI-PR polymer crosslinked by CL). The lower the temperature and the shorter the time the better the color of the cure coating. A nitrogen atmosphere for curing also reduces color formation. Generally 15 to 60 minutes provides sufficient cure at the above temperature ranges. The hardness of the coating is controlled to a degree by the amount of heating.

For many substrates only cleaning is necessary to provide good adhesion of the anti-fogging coating. However, when the substrate is particularly hydrophobic, it has been found effective to "etch" the surface before the coating is applied. In the case of glass the etching may be accomplished by dilute hydrofluoric acid. With polymeric substrates, such as polycarbonate, an acid wash, which tends to oxidize and/or sulfonate the surface, is particularly effective. A solution of 1 to 3 percent by weight chromic acid in concentrated sulfuric acid gives excellent results. For example, the treatment of polycarbonate appears to make the surface hydrophilic after only a few minutes exposure.

The degree of fogging protection provided by the coating is approximately proportional to the thickness of the coating. Good results are obtained when the coating is 0.5 to 3 mils or thicker, but for some uses thickness may range well outside these limits.

The following examples are provided for illustration and are not intended to limit the scope of the invention. All parts and percentages are by weight unless otherwise noted. The following abbreviations are used in the examples:

| | |
|---|---|
| ECH | epichlorohydrin |
| PEI (numbers) | polyethylene imine (approximate number average molecular weight) |
| EO | ethylene oxide |
| AN | acrylonitrile |
| MBA | N,N'-methylene bisacrylamide |
| GM | glycidyl methacrylate |
| G | glycidol |
| S | styrene |
| IPA | isopropyl acrylamide |

The following test procedures are used in the examples:

FOGGING

Qualitative determinations of resistance to fogging are made by breathing on the surface for at least ten seconds and observing whether water condenses on the surface. A plus (+) indicates that no significant condensation formed on the surface. A minus (−) indicates that condensation forms readily.

Quantitative determination as indicated by Fogging Time in seconds is determined by exposure of the surface to air at 40° C saturated with water vapor. The sample is conditioned for 24 hours at 50 percent relative humidity, 25° C. The water saturated air is passed through a one and ½ inch diameter tube at 1,100 cc. per minute. At the end of the glass tube are 1/32 inch high projections so that the sample surface can be held against the end of the tube and still provide sufficient air flow across the surface. The Fogging Time is the time from the placement of the sample against the projections until fifty percent of the exposed circular area displays fogging.

As a bench-mark, uncoated polycarbonate fogs almost instaneously in this test to yield a value of one or two seconds. A commercial anti-fogging coating offered under the "HYDRON" trademark by Woodstream-Hydron Corporation of Lititz, Pennsylvania, believed to be described in Example I to IV of U.S. Pat. No. 3,488,215 to Shepherd et al., yields a fogging time of about 30 seconds.

HARDNESS

Hardness is a qualitative measure of the thumbnail hardness and general abrasion resistance of the coating. A plus (+) indicates that the surface cannot be scratched with the finger nail and is generally abrasion resistant to handling and general use. A minus (−) indicates that the surface can be scratched and in most applications would be abraded easily. A plus/minus (±) indicates marginal results in some compositions. Pencil hardness commonly ranges from 2H to 4H.

ADHESION

Adhesion of the coating to the substrate is determined by scribing sets of horizontal and vertical lines one-eighth inch apart to yield a grid on the surface with a razor blade, applying a piece of pressure sensitive adhesive tape to the surface and quickly removing it. The quantitative measurement is the percent coating within the grid area lifted off.

DETERGENT STABILITY

The coated surface is immersed for 16 hours in a 0.2 percent detergent solution at room temperature and wiped with a facial tissue. The surface quality is observed and in some instances adhesion tests are performed on the exposed samples.

EXAMPLE 1

A lens from a safety goggle of commercially available polycarbonate resin in the shape pictured in FIG. 1 is washed in hot detergent solution, rinsed and dried, hot washed with trichloro-trifluoroethane and dried.

A coating formulation is prepared by dissolving 100 parts (2.3 equivalent weights) polyethylene imine ($M_n$ of 600; 500–2,500 cps at 25° C; at least 99% $C_2H_5N$) in ethylene glycol monoethyl ether/mixture of 1-and 2-propanol (1/1) at about 15 percent concentration. A charge of 55 parts AN (1 mole) is added to the solution and allowed to react. An exotherm of approximately 10° C is observed. After the solution is allowed to cool to room temperature, 17 parts (0.1 mole) MBA is added. The mixture may be heated to bring it into solution. After the solution is allowed to cool, 111 parts ECH (1.2 moles) are added. After the exotherm is dissipated the solution is heated to 85° C. After cooling and filtering the solution is clear and stable for more than 24 hours at 25° C and for at least a week at 0° C.

Figure 2:
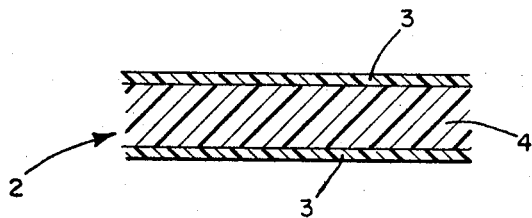
FIG. 2 is a sectional view along the line 2—2 of FIG. 1.

The lens 2 is dipped into the solution, allowed to dry and cured in an oven at 90° C for 15 to 60 minutes. The coating 3 is apparently fully cured at 30 minutes and significant yellowing does not occur until 60 minutes. The detergent stability of the coated goggle pictured in FIGS. 1 and 2 is good with Fog Times ranging from 50 to 65 seconds. After detergent exposure the Fog Time is 70 to 120 seconds with Adhesion rated adequate.

EXAMPLE 2

The procedure of Example 1 is repeated except that the composition of the coating is as follows:

| | |
|---|---|
| 100 parts (2.3 equivalent weights) | PEI (600) |
| 85 parts (1.6 moles) | AN |
| 20 parts (0.18 mole) | IPA |
| 15 parts (0.1 moles) | MBA |
| 100 parts (1.1 moles) | ECH |

After the lens is dipped the coating is cured at 110° C for 15 to 60 minutes. No appreciable improvement is observed by the longer cure times and the color intensity of the coating is increased upon exposure to the heat. The Hardness is good and Detergent Stability excellent. The Fog Time ranges from 35 to 40 seconds with excellent Adhesion indicated by 0 percent lift.

The above procedure is repeated except that the polycarbonate lens is "etched" by a procedure including the steps of a hot detergent wash, rinse, dry and a 30 second "etch" by 2 percent chromic acid in sulfuric acid at 25° C. The lens is then rinsed, dried and dip coated with the composition above using the same procedure. The Fog Time is 40 to 50 seconds with excellent Detergent Stability. The Adhesion remains excellent with 0 percent lift.

EXAMPLE 3

The procedure of Example 1 is repeated except that the PEI is reacted in a water solution of about 15 to 20 percent solids. The AN reaction yields a temperature rise of about 12° C. The solution is heated to 75° C after the ECH is added and after filtering a surfactant, nonyl phenyl polyethylene glycol ether, is added.

The lens is "etched" as in Example 2 and dipped in the coating solution. The coated lens is dried and cured for 15 to 60 minutes at 90° C. The coatings are colorless and exhibit excellent detergent resistance. The Fog Time is 25 to 30 seconds and adhesion is 0 percent lift. When the etching of the lens is skipped, the surface was slightly mottled suggesting poor wetting by coating solution.

EXAMPLE 4

The procedure of Example 1 is repeated except that the composition of the coating comprises PEI of various molecular weights and a single cross-linker in various proportions. Typical results are provided in Table I:

TABLE I — COATINGS OF EXAMPLE 4

PEI of Varying Molecular Weight with Crosslinkers in Varying Amounts

| PEI Molecular wt. ($M_n$) | Amount (parts) | Crosslinker Type | Crosslinker Amount (parts) | Detergent resistance | Fogging time (sec.) |
|---|---|---|---|---|---|
| 50,000 to 100,000 | 100 | ECH | 100 | + | 12 |
| | 200 | | 100 | + | 12 |
| 40,000 to 60,000 | 100 | ECH | 100 | + | 120 |
| | 100 | | 200 | + | 11–21 |
| 40,000 to 60,000 | 100 | glycidol | 100 | + | 120 |
| (PEI/EO 10/1) | 100 | | 50 | + | 90–120 |
| 600 | 100 | | 100 | + | 120 |
| | 100 | | 500 | + | 15 |
| 40,000 to 60,000 | 100 | GM | 150 | + | 120 |
| (PEI/EO 10/1) | 100 | | 100 | + | 19–23 |
| | 100 | | 40 | − | 34 |
| 600 | 100 | GM | 50 | − | 23 |
| | 100 | | 100 | + | 11 |
| | 100 | | 200 | + | 18 |

EXAMPLE 5

Procedure 1 is repeated except that the composition of the coating is varied as shown in Table II. Typical results for coating compositions using combinations of various cross-linking compounds with and without other reactive groups on the PEI are provided. The data in Table II further illustrates that the mole concentration of reactive groups of the cross-linker may be a good deal higher than the number of amine-hydrogen sites on the PEI and still yield a useful coating.

TABLE II — COATINGS OF EXAMPLE 5

One Part PEI(600) Reacted With Various Combinations of Crosslinkers and Pendant Reactants

| Parts of Pendant Reactant Added | | | Parts of Crosslinker Added | | | Detergent Resistance | Fogging Time (sec.) |
|---|---|---|---|---|---|---|---|
| S | IPA | AN | ECH | GM | G | | |
| − | − | − | 1.0 | 0.2 | 0.8 | + | 120 |
| − | − | − | 1.0 | 0.2 | 0.6 | + | 120 |
| − | − | − | 0.8 | 0.2 | 0.8 | + | 104 |
| − | − | − | 0.8 | 0.2 | 0.6 | + | 120 |
| − | − | − | 0.6 | 0.2 | 0.6 | + | 72 |
| − | − | − | 0.4 | 0.4 | 0.4 | + | 83 |
| − | − | − | − | 0.4 | 0.1 | + | 120 |
| 0.6 | − | − | 0.8 | − | 0.4 | + | 120 |
| 0.6 | − | − | 1.0 | − | − | + | 104 |
| 0.2 | − | − | 1.0 | − | 0.6 | + | 120 |
| 0.1 | − | − | 1.0 | − | 0.6 | + | 120 |
| − | 0.4 | − | 1.0 | − | − | + | 120 |

EXAMPLE 6

Solutions of various reactants are prepared in concentrations of 10 to 50 parts per 100 parts PEI (75,000) in 2-propanol. Polycarbonate lenses are dip-coated in the solution after which the coating is cured to provide a thickness of 0.5 to 3 mils. Qualitative observations are provided in Table III.

PEI (75,000) is a viscous liquid with a Brookfield viscosity of 15,000 to 25,000 cps. at 25° C. While this uncross-linked imine polymer can be solution-coated on polycarbonate it is not permanent and only superficial anti-fogging characteristics are obtained. When the compounds such as acrylonitrile are reacted onto the polymer, Some improvement in the physical characteristics of the film is observed, however, the permanence of the coating is still poor. In general, the more hydrophobic the cross-linker is, the poorer the initial anti-fog characteristics. Thus, a compound such as divinyl benzene would generally be used in combination with other cross-linking compounds. Particularly effective are epichlorohydrin, glycidol, glycidyl methacrylate, bisphenol-A, fumaric acid, dichloromaleic anhydride, and benzaldehyde. Where both a plus and minus sign are shown under a physical property heading, it is an indication that marginal characteristics are obtained depending upon the substrate, concentration of the cross-linker the molecular weight of the PEI and the conditions of the coating.

TABLE III - COATINGS OF EXAMPLE 6

PEI (75,000) Reacted With Various Cross-Linkers

| Reactant | Color | Hardness | Detergent stability | Fogging |
|---|---|---|---|---|
| none | — | — | — | ± |
| AN | — | — | — | ± |
| IPA | — | — | — | ± |
| acrylamide | — | — | — | ± |
| EPCH | — | + | + | + |
| G | — | + | ± | + |
| GM | — | + | + | + |
| bisphenol-A | clear | ± | + | + |
| Epon 834 | sl. yellow | + | ± | + |
| fumaric acid | clear | + | + | + |
| dichloromaleic anhydride | clear | + | + | + |
| pyromellitic anhydride | clear | + | + | + |
| 2,5 - hexadione | sl. yellow | + | + | + |
| bis(dichloroethyl)ether | clear | + | + | + |
| dipentene dioxide | sl. yellow | + | + | + |
| adipyl chloride | — | + | — | + |
| itaconic acid | sl. haze | + | — | + |
| methylene bis(4-phenyl isocyanate) | sl. haze | + | + | + |
| methyl isobutyl ketone | sl. haze | — | ± | + |
| glutaric anhydride | — | — | + | + |
| 5,5-dimethyl (1,3-cyclohexadione) | clear | — | + | + |
| polyacrylic acid | — | + | — | + |
| formaldehyde | — | + | ± | ± |
| methylene-N,N-bisacrylamide | — | + | ± | + |
| benzaldehyde | — | — | + | + |
| divinyl benzene | — | — | ± | ± |
| acetone | — | + | + | + |
| polyethylene glycol methacrylate | — | + | — | + |
| diacetone acrylamide | — | — | + | + |
| ethylene glycol dimethacrylate | — | + | + | + |
| allyl chloride | — | + | — | + |

EXAMPLE 7

A solution of 100 parts PEI in 500 parts water is prepared. A charge of 55 parts acrylonitrile is added and allowed to react with the attendant temperature increase. While the solution is still warm, 16 parts methylene bisacrylamide is added after which the solution is cooled to 22° C. An amount of 110 parts epichlorohydrin is added incrementally over a period of one-half hour to control the temperature rise. After the entire amount is added the solution is heated to 80° C., then immediately cooled to 22° C and filtered. The viscosity of the coating solution may be increased by reacting at 80° C for 15 to 60 minutes. The solution is stable.

An abrasion resistant sheet of an interpolymer of allyl diglycol carbonate/vinyl acetate/methyl methacrylate is etched with chromic acid for 90 seconds at 22° C. The sheet is dipped in the coating solution prepared as above, dried and cured at 90° C in air for 1 hour. The Fog Time is 20 seconds and the Adhesion is excellent in that there is 0 percent lift in the tape tests both before and after immersion in detergent solution for 16 hours.

EXAMPLE 8

The procedure of Example 1 is repeated except that the 100 parts PEI(600) is placed in solution in a mixture of water/2-propanol (8/1) before reaction with the other components. A polycarbonate lens is etched with chromic acid, rinsed, dried, and dipped into the solution. After drying the coated lens is cured at 90° C for 15–60 minutes in nitrogen atmosphere. A hard, colorless coating is obtained with excellent detergent stability. At all cure times the Adhesion is excellent.

The average coating weight on the lens is 0.23 grams per lens such that a coating of approximately 1 mil is obtained. The equilibrium absorption of the coating at 50 percent relative humidity is about 15 percent. At 80 percent relative humidity the equilibrium water absorption is about 25 to 45 percent. At 100 percent relative humidity the water absorption of the coating is almost 50 percent without affecting the adhesion of the coating or its utility as on anti-fog coating.

After the coating is allowed to reach equilibrium at 50 percent relative humidity and 22° C, the Fog Time ranges from 50 to 70 seconds depending on the cure time. After the part is immersed in detergent solution at 22° C for 16 hours and air dried for one-half hour at 22° C, the Fog Time is 95 to greater than 120 seconds. Even after the lens is brought to equilibrium at 80 percent relative humidity and 22° C, the Fogging Time is still in the range of 30 to 45 seconds. The coating is uneffected after 16 hours at −6° C and −78° C.

EXAMPLE 9

Figure 3:
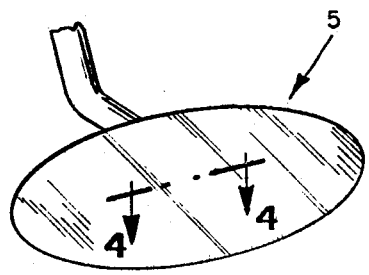
FIG. 3 is a view of a mirror.
Figure 4:
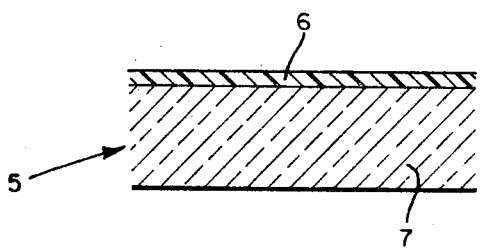
FIG. 4 is a sectional view along line 4—4 of FIG. 3.

Plate glass with mirror surface quality in the shape of FIG. 3 is spray coated with the composition of Example 1. After cure at 90° C., for 30 minutes a durable, fog-resistant mirror 5 is obtained as pictured in FIGS. 3 and 4. The surface 6 is optically transparent and resistant to repeated washings without losing its anti-fogging property.

EXAMPLE 10

Figure 5:
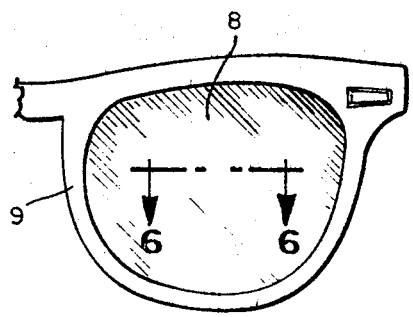
FIG. 5 is a view of a lens.
Figure 6:
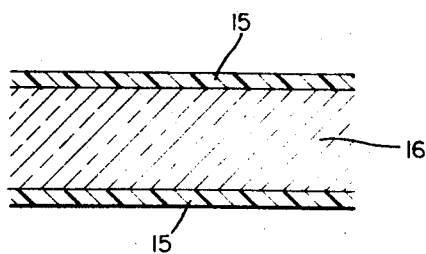
FIG. 6 is a blow-up of a sectional view along the line of 6—6.

A lens molded of polymethyl methacrylate of a molecular weight of about 100,000 in the shape of FIG. 5 is dip coated in the solution as prepared under Example 1. After the coating 15 is dried and cured for 30 minutes at 90° C, an abrasion resistant, anti-fogging lens as pictured in FIGS. 5 and 6 is obtained.

EXAMPLE 11

A 20 percent solution of poly(2 methyl aziridine) with a molecular weight of 600 to 1,000, is prepared in water/2-propanol (4:1 by volume). This solution is reacted with 45 parts of acrylonitrile. While the solution is still warm, 16 parts MBA are added after which the solution is cooled to 22° C. A charge of 110 parts ECH is added incrementally over a period of one-half hour to control the temperature rise. After this addition, the solution is held at 80° C. for 15 to 30 minutes to increase viscosity to the range suitable for dipping or spraying application. After curing a good anti-fog coating is obtained.

EXAMPLE 12

The procedure of Example 8 is repeated except that the following components are used in the coating:
3.6 parts triethylene tetramine (0.25 mole)
2.0 parts AN (0.04 mole)
0.6 part MBA (0.004 mole)
4.0 parts ECH (0.43 mole)

After cure of the coating on either polycarbonate or the interpolymer substrate used in Example 7 for 40 minutes at 90° C in air, the Fog Times are greater than 120 seconds and the surface in slightly soft.

I claim:

1. A non-fogging material comprising a normally fogging substrate having on at least one surface thereof a non-fogging, water insoluble, hydrophilic coating comprising a polyalkylene imine having substantially all of its nitrogen atoms attached to a plurality of reactive compounds, at least one of said reactive compounds being a cross-linking compound and another being a monofunctional reactive compound containing a polar functional group to promote adhesion to the substrate, said reactive compounds being reacted with the polyalkylene imine in an amount of at least one reactive equivalent per equivalent weight of the polyalkylene imine.

2. A material in accordance with claim 1 in which the cross-linking compound contains functional groups capable of reacting with the polyalkylene imine selected from a nonaromatic ethylenic unsaturated group, an epoxy group, a halo group, a carboxylic acid or anhydride group, an aldehyde group, a ketonic group, an isocyanato or isothiocyanato group or a phenolic hydroxy group.

3. A material in accordance with claim 2 in which the polyalkylene imine is polyethylene imine.

4. A material in accordance with claim 1 in which the mono-functional reactive compound containing a polar functional group contains such a group selected from a cyano group, an amido group, an acetyl group and an aryl group.

5. A material in accordance with claim 4 in which the polyalkylene imine is polyethylene imine.

6. A material in accordance with claim 1 in which there are at least three reactive compounds attached to the polyalkylene imine, two of said reactive compounds functioning as cross-linking compounds and another being a monofunctional reactive compound containing a polar functional group to promote adhesion to the substrate.

7. A material in accordance with claim 6 in which the cross-linking compounds are present in amounts of about 0.3 to 2.5 moles per equivalent weight of the alkylene imine repeating unit and the compound containing the polar functional group is present in an amount up to about 0.80 mole per equivalent weight of the alkylene imine repeating unit.

8. A material in accordance with claim 7 in which the polyalkylene imine is polyethylene imine, two of the cross-linking compounds are epichlorohydrin and N,N'-methylene bisacrylamide and the mono-functional compound containing a polar group is acrylonitrile.

9. A material in accordance with claim 8 in which the substrate is polycarbonate.

10. A material in accordance with claim 7 in which two of the cross-linking compounds are epichlorohydrin and glycidyl methacrylate and the mono-functional compound containing a polar group contains an acrylamide group.

11. A material in accordance with claim 10 in which the polyalkylene imine is polyethylene imine and the compound containing an acrylamide group is isopropyl acrylamide.

12. A material in accordance with claim 10 in which the substrate is polycarbonate.

13. A material in accordance with claim 7 in which the substrate is polycarbonate.

14. A material in accordance with claim 6 in which the substrate is polycarbonate.

15. A method of applying a non-fogging, water insoluble, hydrophilic coating to a substrate comprising:
1. preparing a solution of polyalkylene imine;
2. adding a mono-functional reactive compound containing a polar functional group to said polyalkylene imine solution in an amount up to about 0.80 mole per equivalent weight of the alkylene imine repeating unit and reacting said compound with the amine hydrogen of the polyalkylene imine, said reaction being exothermic;
3. cooling the reaction solution of step (2) if necessary to prevent an exothermic runaway reaction;
4. after thermally stabilizing the reaction of step (2), adding at least one cross-linking compound to the solution which is capable of reacting with and cross-linking the polyalkylene imine polymer, said cross-linking compound being present in quantities sufficient to yield a water insoluble coating upon complete reaction;
5. heating the solution containing the cross-linking compound to partially react it with the polyalkylene imine without cross-linking the imine polymer to a degree that the polymer will gel or come out of solution;
6. cooling the partially cross-linked polyalkylene imine solution to stabilize it;
7. applying the partially cross-linked polyalkylene imine solution to at least one surface of the substrate; and
8. heating the coated substrate to cause the solvent to be driven off and the cross-linking reaction to be completed whereby substantially all of the nitrogen atoms of the polyalkylene imine are attached to a plurality of reactive compounds so as to provide a non-fogging, water-insoluble, hydrophilic coated substrate.

16. The method of claim 15 in which the cross-linking compound is added to the polyalkylene imine solution in step (4) in an amount of about 0.3 to 2.5 moles per equivalent weight of the alkylene imine repeating unit.

17. The method of claim 15 in which the polyalkylene imine is polyethylene imine.

18. The method of claim 15 in which the mono-functional reactive compound containing a polar functional group is selected from the group consisting of acrylonitrile, an acrylamide, a methacrylamide, a methacrylate and an acrylate.

19. The method of claim 15 in which the cross-linking compound contains functional groups capable of reacting with the polyalkylene imine selected from a nonaromatic ethylenic unsaturated group, an epoxy group, a halo group, a carboxylic acid or anhydride group, an aldehyde group, a ketonic group, an isocyanato or isothiocyanato group and a phenolic hydroxy group.

20. The method of claim 15 in which the substrate is a polymer whose surface is oxidized or sulfonated prior to applying the coating in step (7).

21. The method of claim 15 in which the substrate is polycarbonate whose surface is treated with a dilute solution of chromic acid in concentrated sulfuric acid prior to applying the coating in step (7).

22. The method of claim 15 in which the cross-linking compound is added and reacted with the polyalkylene imine in at least two parts by:

4A. adding a first cross-linking compound to the polyalkylene imine solution to react with the polyalkylene imine without causing the polyalkylene imine to cross-link to a degree that the imine polymer will gel or come out of solution;

4B. adding a second cross-linking compound to the solution containing the polyalkylene imine and the first cross-linking compound, said second cross-inking compound being capable of reacting with both the amine hydrogen and the nitrogen of the polyalkylene imine; and 4C. reacting the first and second cross-linking compounds with the polyalkylene imine to increase the molecular weight without cross-linking the imine polymer to a degree that the imine polymer will gel or come out of solution.

23. The method of claim 22 in which the first cross-linking compound is glycidyl methacrylate and the second cross-linking compound is epichlorohydrin 24. The method of claim 23 in which the polyalkylene imine is polyethylene imine with a molecular weight in the range of about 400 to about 1,000.

* * * * *